United States Patent [19]

Nagashima et al.

[11] Patent Number: 4,653,408
[45] Date of Patent: Mar. 31, 1987

[54] TABLE MECHANISM FOR CONTROLLING TABLE ATTITUDE

[75] Inventors: Mitsuyoshi Nagashima, Sayama; Toshikazu Hatsuse, Tanashi; Masakazu Miyashita, Kokubunji; Akira Kanai, Higashiyamato, all of Japan

[73] Assignee: Citizen Watch Co., Ltd., Tokyo, Japan

[21] Appl. No.: 761,005

[22] Filed: Jul. 30, 1985

[30] Foreign Application Priority Data

Sep. 5, 1984 [JP] Japan .................... 59-185625
Sep. 5, 1984 [JP] Japan .................... 59-185626

[51] Int. Cl.$^4$ ............................... F16C 32/06
[52] U.S. Cl. ............................ 108/20; 108/143; 384/12
[58] Field of Search ............... 308/3 A, 5 R, 241; 108/137, 143, 20

[56] References Cited

U.S. PATENT DOCUMENTS

| | | | |
|---|---|---|---|
| 3,218,108 | 11/1965 | Sazavsky | 308/5 R |
| 3,512,848 | 5/1970 | Uhtenwoldt | 308/5 R |
| 3,572,680 | 3/1971 | Neff | 108/143 X |
| 4,351,574 | 9/1982 | Furukawa et al. | 308/3 A |
| 4,457,566 | 7/1984 | Mohsin | 308/5 R |
| 4,504,048 | 3/1985 | Shiba et al. | 308/5 R X |
| 4,506,935 | 3/1985 | Suzuki et al. | 308/5 R |
| 4,517,852 | 5/1985 | Kawakami et al. | 308/5 R X |
| 4,523,410 | 6/1985 | Yoshioka | 308/5 R X |
| 4,569,562 | 2/1986 | Sato et al. | 308/5 R |

FOREIGN PATENT DOCUMENTS 1915940 10/1969 Fed. Rep. of Germany ..... 308/5 R

*Primary Examiner*—Peter A. Aschenbrenner
*Attorney, Agent, or Firm*—Koda and Androlia

[57] ABSTRACT

A direct-acting table mechanism in which tables are driven without any contact by use of a hydrostatic fluid for thrust-transmitting the tables in their sliding direction. The tables are hydrostatically supported on hydrostatic guides on a bed, and differential pressures are supplied to the hydrostatically supporting portions to control the attitude of the tables. This table mechanism is of high degree of accuracy uninfluenced by errors in the feed screw system, high rigidity and thus permits highly stable fine feed.

11 Claims, 10 Drawing Figures

TABLE MECHANISM FOR CONTROLLING TABLE ATTITUDE

BACKGROUND OF THE INVENTION

1. Field of the Invention

This invention relates to a direct-acting table mechanism requiring precise control of position and high degree of straight motion for use in ultraprecision machine tools, measuring instruments, and other production systems, especially in surface finish grinding of semiconductor wafer substrates, grinding of magnetic heads and machining of lenses.

2. Description of the Related Art

In general, many table mechanisms requiring a function of positioning control use a screw feed system.

The screw feed system is designed: A feed screw is attached rotatably in its axial direction on supports, and nuts are attached to the table and screwed onto the feed screw. By turning the feed screw, the table is fed in its axial direction.

The screw feed system has some problems: Errors in mounting the feed screw and the table guide surface will affect accuracy of guide or the weight of screw will cause the screw to be deflected and disturbance exerted by twisting motion of the deflected screw will be transmitted to the table through the nuts to affect accuracy of movement. However, it is difficult to eliminate these problems. Especially in case of the workpiece formed of a hard brittle material such as the aforementioned semiconductor wafers, magnetic heads or lenses, if vibration occurs to the workpiece, fine vibration, for example, may cause chipping. To prevent this, the feed control of workpiece also requires a smooth constant-rate feed mechanism uninfluenced by irregularities of the sliding guide surface. Thus it is desirable to couple the nuts hydrostatically to the table so as to exclude the influence of errors in the screw feed system, but there has not been available any device satisfying high accuracy and rigidity.

SUMMARY OF THE INVENTION

Considered from the above-mentioned problems, an object of the invention is to provide a table mechanism which is free from the influence of the error in the feed screw system, can be positioned with high accuracy and uses a hydrostatic fluid for thrust-transmitting the table in the sliding direction so as to drive the table without any contact and which is designed to enhance the rigidity of the table.

A further object of the invention is to provide a direct-acting table mechanism which permits precise positioning and straight motion without effects of errors in the feed screw sysem, in which by use of a hydrostatic fluid for thrust-transmitting the table in the sliding direction, the table is not only driven without any contact but also hydrostatically supported on the hydrostatic guides on the bed, to which differential pressures are applied so as to control the attitude of the table.

According to a first aspect of the invention, there is provided a table mechanism comprising a bed; a vertical guide and a horizontal guide of the bed or formed on the bed; a pair of supports fixed to the bed; a motor fixed to one of the pair of supports; a feed screw supported rotatably by the supports, connected to the motor and adapted to be turned by the motor; a first table holding nuts for screwing onto the feed screw and having a lower extension engagedly guided by the vertical guide and horizontal extensions engagedly guided by the horizontal guide, the first table moving straight through the nuts screwed onto the feed screw connected to the motor and adapted to be turned by the motor; a second table having lower extensions engagedly guided by the vertical guide and horizontal extensions engagedly guided by the horizontal guide; wherein for the first table and the second table, hydrostatically coupling portions each comprising hydrostatic pads are formed on a pair of opposed surfaces of the tables at right angles to a direction of a movement of the tables between the lower extension of the first table and each of the lower extensions of the second table, and by hydrostatic coupling, the second table is driven integrally with the table.

According to a second aspect of the invention, there is provided a table mechanism comprising a bed; a vertical guide and a horizontal guide of the bed or formed on the bed; a pair of supports fixed to the bed; a motor fixed to one of the pair of supports; a feed screw supported rotatably by the supports, connected to the motor and adapted to be turned by the motor; a first table holding nuts for screwing the feed screw and having a lower extension engagedly guided by the vertical guide and horizontal extensions engagedly guided by the horizontal guide, the first table moving straight through the nuts screwed onto the feed screw connected to the motor and adapted to be turned by the motor; a second table having lower extensions engagedly guided by the vertical guide and horizontal extensions engagedly guided by the horizontal guide; wherein for the first table and the second table, hydrostatically coupling portions each comprising hydrostatic pads are formed on a pair of opposed surfaces of the tables at right angles to a direction of a movement of the tables between the lower extension of the first table and each of the lower extensions of the second table; hydrostatically and horizontally supporting portions each comprising a plurality of hydrostatic pads are formed between the horizontal guide and upper surfaces of the horizontal extensions of the first and second tables and between the horizontal guide and lower surfaces of the horizontal extensions of the first and second tables; and hydrostatically and vertically supporting portions each comprising a plurality of hydrostatic pads are formed between the vertical guide and one of a pair of vertically guided surfaces of the lower extensions of the first and second tables and between the vertical guide and the other of the pair of vertically guided surfaces of the lower extensions of the first and second tables.

According to a third aspect of the invention, there is provided a table mechanism comprising a bed; a vertical guide and a horizontal guide of the bed or formed on the bed; a pair of supports fixed to the bed; a motor fixed to one of the pair of supports; a feed screw supported rotatably by the supports, connected to the motor and adapted to be turned by the motor; a first table holding nuts for screwing onto the feed screw and having a lower extension engagedly guided by the vertical guide and horizontal extensions engagedly guided by the horizontal guide, the first table moving straight through the nuts screwed onto the feed screw connected to the motor and adapted to be turned by the motor; a second table having lower extensions engagedly guided by the vertical guide and horizontal extensions engagedly guided by the horizontal guide; wherein for the first and second tables, hydrostatically supporting portions each comprising hydrostatic pads are formed on a pair of opposed surfaces of the tables at right angles to a direction of a movement of the tables between the lower extension of the first table and each of the lower extensions of the second table; hydrostatically and horizontally supporting portions each comprising a plurality of hydrostatic pads are formed between the horizontal guide and upper surfaces of the horizontal extensions of the first and second tables and between the horizontal guide and lower surfaces of the horizontal extensions of the first and second tables; and hydrostatically and vertically supporting portions each comprising a plurality of hydrostatic pads are formed between the vertical guide and one of a pair of vertically guided surfaces of the lower extensions of the first and second tables and between the vertical guide and the other of the pair of vertically guided surfaces of the lower extensions of the first and second tables; the table mechansim further comprising: means for detecting gaps between coupling surfaces of the hydrostatically coupling portions wherein in response to a detecting signal from the detecting means, differential pressures are supplied to the hydrostatic pads on each of the hydrostatically coupling portions so as to correct the gaps between the hydrostatically coupling portions; means for detecting a displacement of the horizontal extensions of the second table with respect to the horizontal guide wherein in response to a detecting signal from the detecting means, differential pressures are supplied to the hydrostatic pads on the upper and lower surfaces of the horizotnal extensions of the second table so as to control the attitude of the second table in a vertical direction; and means for detecting a displacmeent of the lower extenions of the second table with respect to the vertical guide wherein in response to a detecting signal from the detecting means, differential pressures are supplied to the hydrostatic pads on the pair of vertically guided surfaces of the lower extensions of the second table so as to control the attitude of the second table in a horizontal direction.

DETAILED DESCRIPTION OF THE PREFERRED EMBODIMENTS

Figure 1:
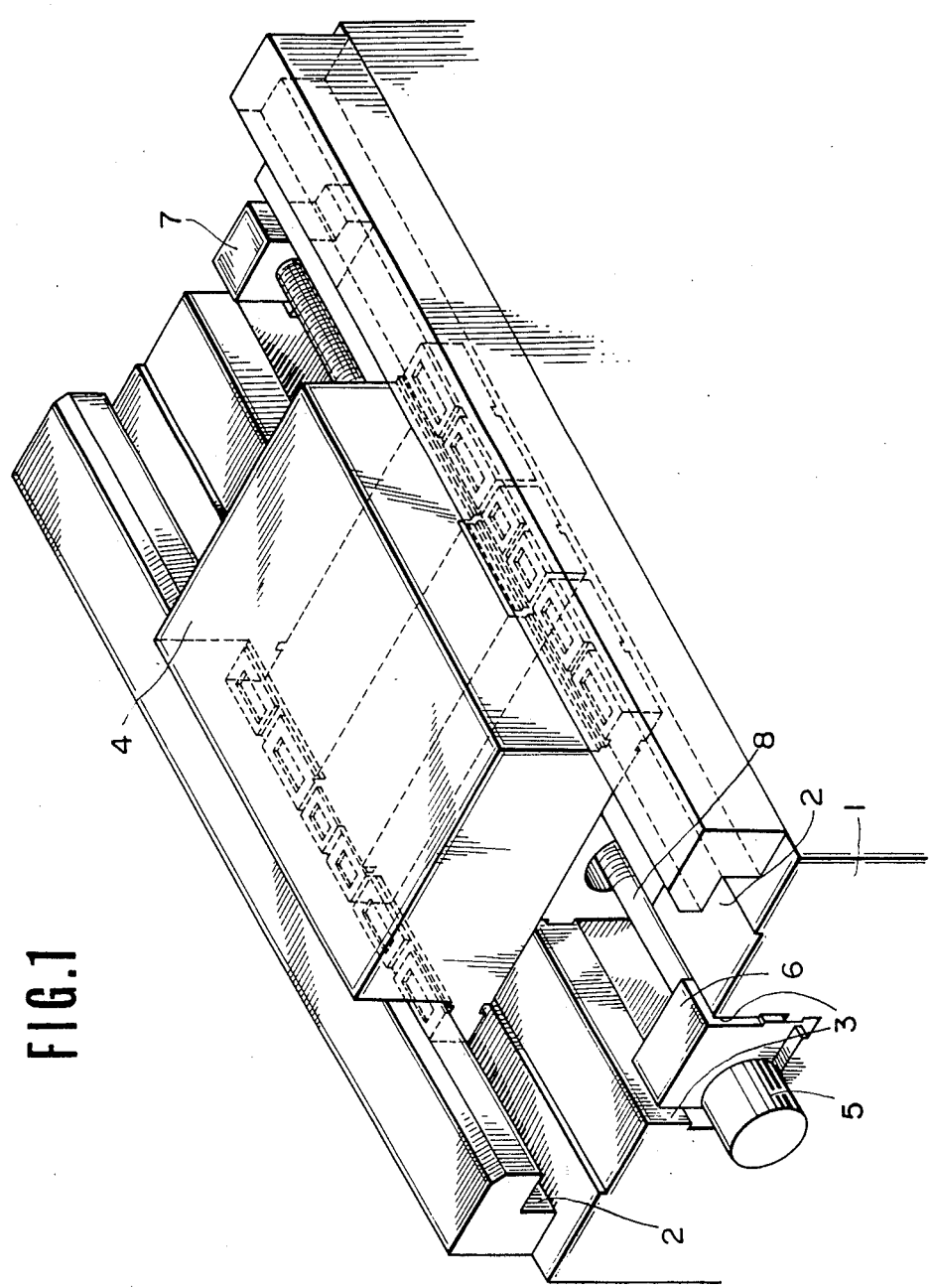
FIG. 1 is a perspective view of a direct-acting table mechanism of the invention.

The embodiments of the invention will now be described with reference to the accompanying drawings:

FIG. 1 is a perspective view of a table mechanism including a bed and hydrostatic guides formed on the bed in accordance with the invention in which 1 is the bed; 2 and 3 the hydrostatic guides; 4 a second table; 5 a driving motor; 6 and 7 supports; and 8 a feed screw.

Figure 2:
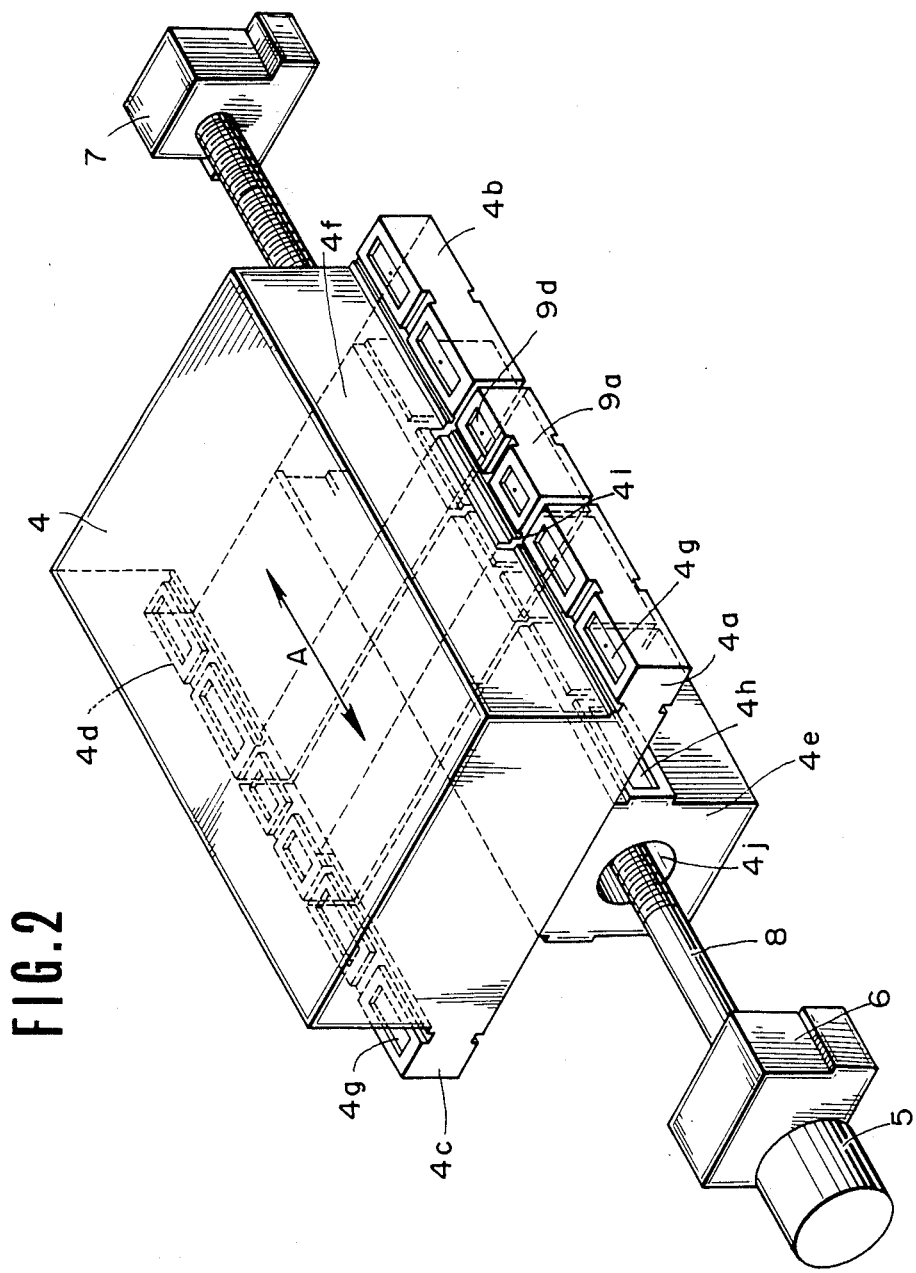
FIG. 2 is a perspective view of the direct-acting table mechanism in which the guides of FIG. 1 are removed.

FIG. 2 is a perspective view of the table mechanism in which the bed 1 and hydrostatic guides 2 and 3 formed on the bed are removed. The second table 4 has four horizontal extensions 4a, 4b, 4c and 4d and two lower extensions 4e and 4f, and on both sides of each extension are disposed a plurality of hydrostatic pads 4g and 4h. In addition, the second table 4 has a generally U-shaped recess 4i in the lower surface for mounting the table 9. The second table 4 engages the bed 1 and hydrostatic guides 2 and 3 on the bed at the four horizontal extensions 4a, 4b, 4c and 4d and the two lower extensions 4e and 4f and moves straight in the direction of arrow A.

Figure 3:
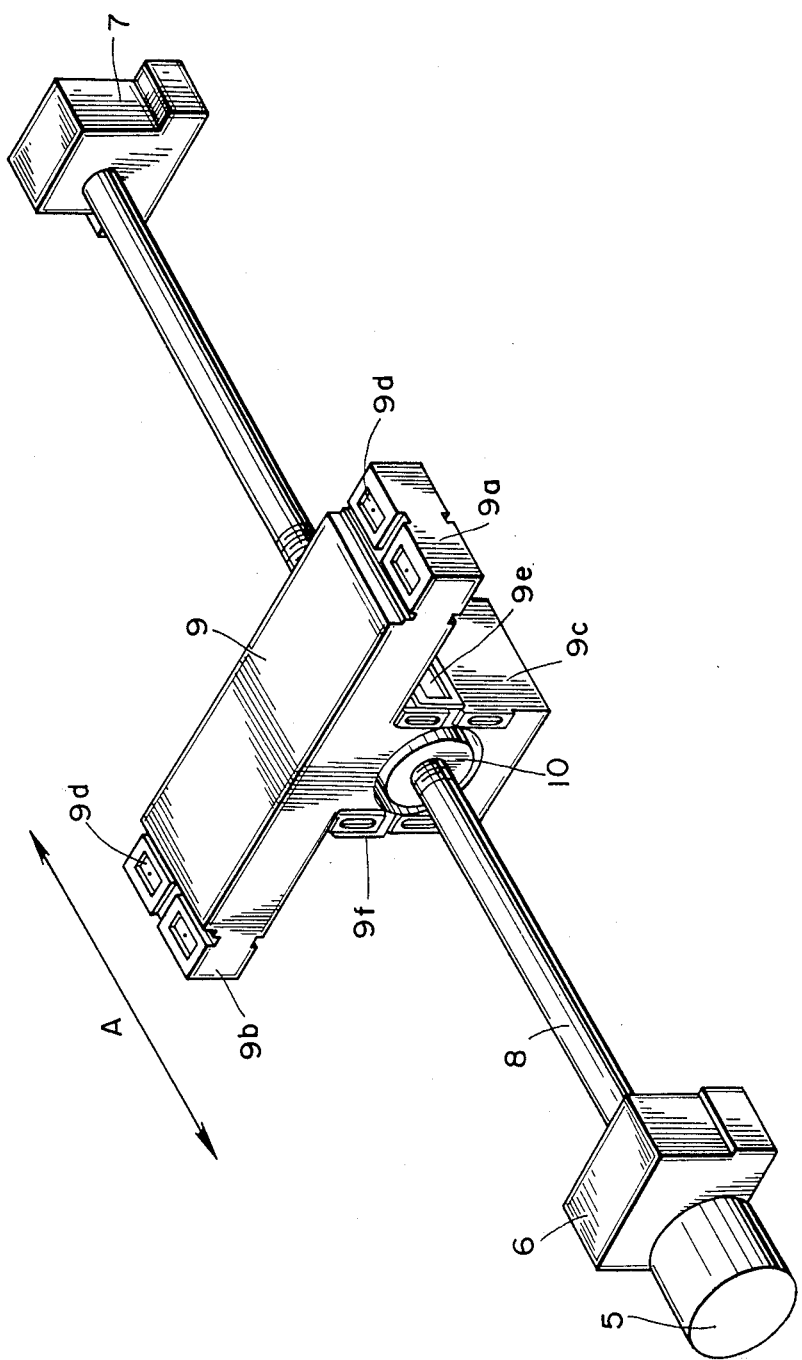
FIG. 3 is a perspective view of the first table.

FIG. 3 is a perspective view of the first table. The first table 9 has two horizontal extensions 9a and 9b and one lower extension 9c which are engagedly guided by the aforementioned hydrostatic guides 2 and 3 and provided with a plurality of hydrostatic pads 9d and 9e on both surfaces thereof. To the lower extension 9c are attached nuts 10 which are screwed onto the feed screw 8. 9f denotes hydrostatic pads at right angles to the feed screw 8, and at the back side of the pads 9f are disposed similar hydrostatic pads.

Figure 4:
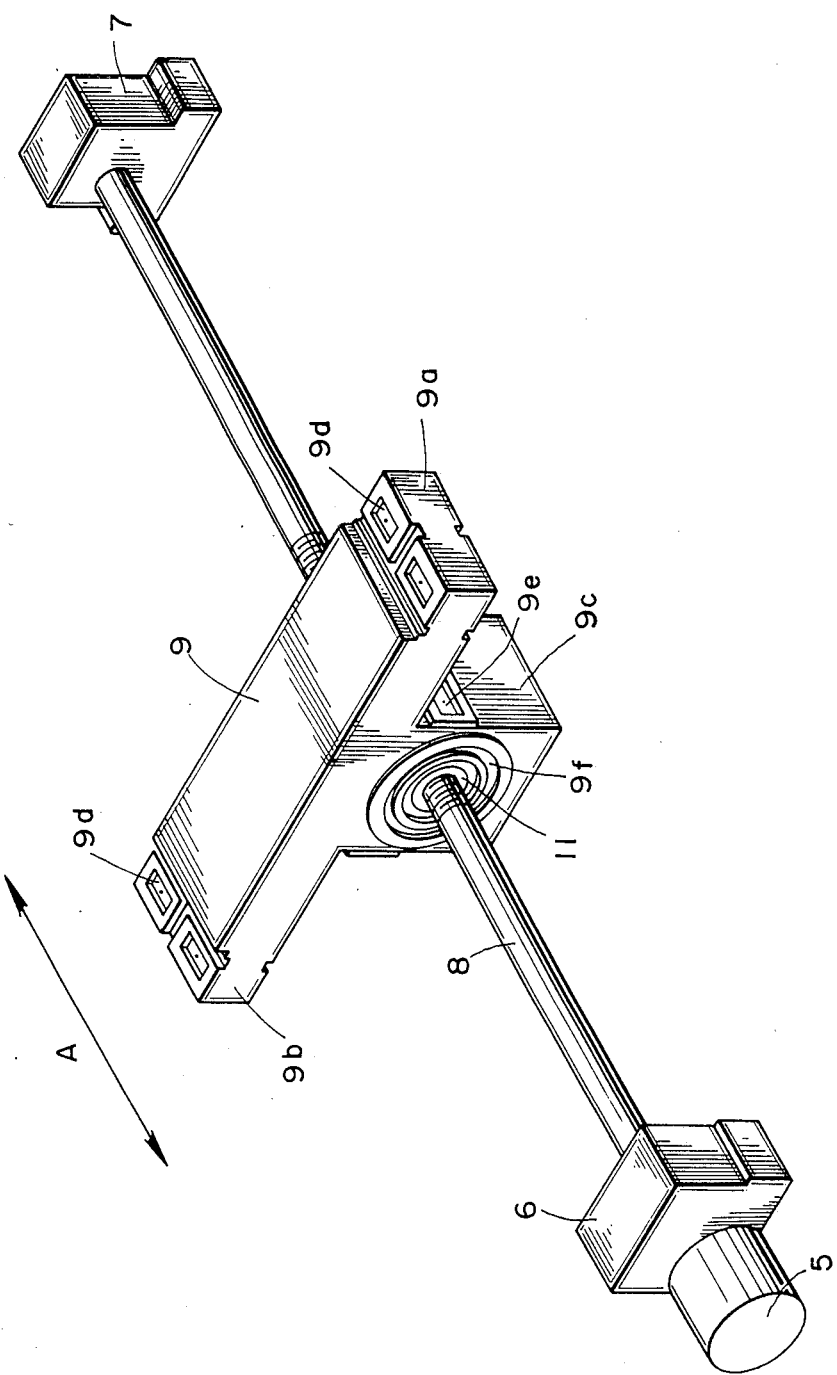
FIG. 4 is a perspective view illustrating a modification of the hydrostatic pads of FIGS. 3.

In FIG. 4, there is provided a single torus-shaped pad 9f' instead of a plurality of hydrostatic pads 9f shown in FIG. 3. This single pad is capable of absorbing the moment caused by the arrangement or position of the separated pads with respect to the axis of the feed screw 8, thus making it possible to transmit only a necessary thrust effectively.

The embodiments will now be detailed with reference to the following sectional views.

Figure 5:
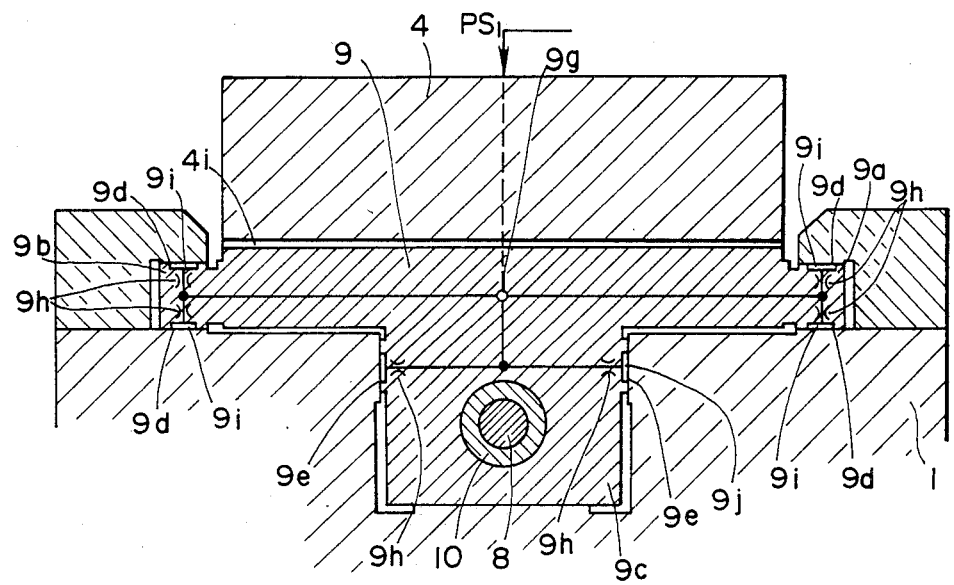
FIG. 5 is a sectional view of the first table.

FIG. 5 is a sectional view of the first table, in which 9d and 9e are the hydrostatic pads which are provided with openings 9i and 9j, respectively. Hydrostatic fluids $P_{S1}$ are forced from an external fluid pressure source 40 in FIGS. 9 and 10 and branched by a line 9g. Then, they flow out of the openings 9i and 9j via each of chokes 9h. Between the bed 1 with the hydrostatic guides 2, 3 on the bed 1 and each of the two horizontal extensions 9a, 9b of the first table 9 and between the bed 1 with the guides 2, 3 thereon and the lower surface extension 9c of the first table 9 are provided small gaps, and by the action of the hydrostatic fluids flowing from the openings 9i and 9j, the first table 9 is hydrostatically supported vertically and horizontally.

Figure 6:
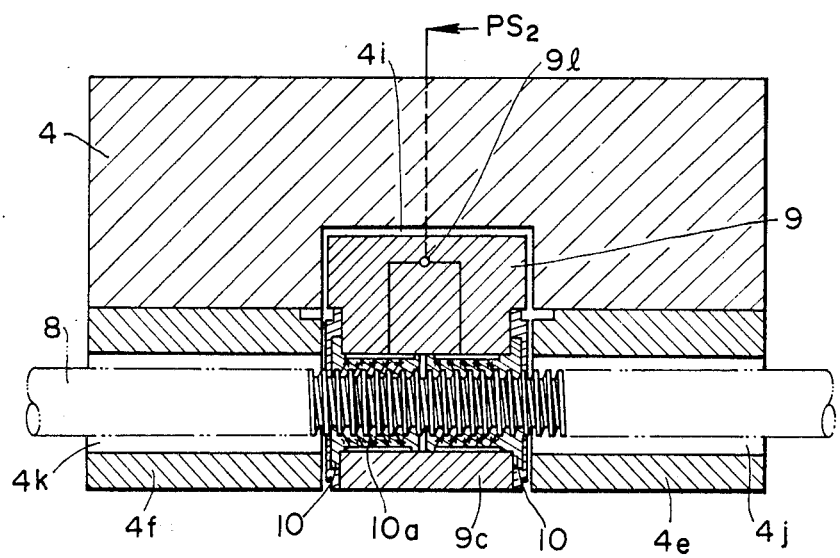
FIG. 6 is a sectional view in an axial direction of the table mechanism.

FIG. 6 is a sectional view in the axial direction of the table mechanism. As mentioned above, the second table 4 is provided with two lower extensions 4e, 4f for supporting the first table 9 hydrostatically by means of the small gaps defined therebetween. 4j and 4k are through holes in which the feed screw is inserted so as to move freely therein. The feed screw 8 is a hydrostatic feed screw. The nuts 10 are opposed to each other in the axial direction of the feed screw 8, attached to the ends of the first table 9, and screwed onto the feed screw 8. The hydrostatic fluids $P_{S2}$ for the screw 8 are forced from the exterior fluid source 40 of FIGS. 9 and 10, branched by the line 9l and supplied to the screw surface through a plurality of chokes 10a. Although this embodiment uses a hydrostatic screw, it will be understood that other screws may be used instead.

Figure 7:
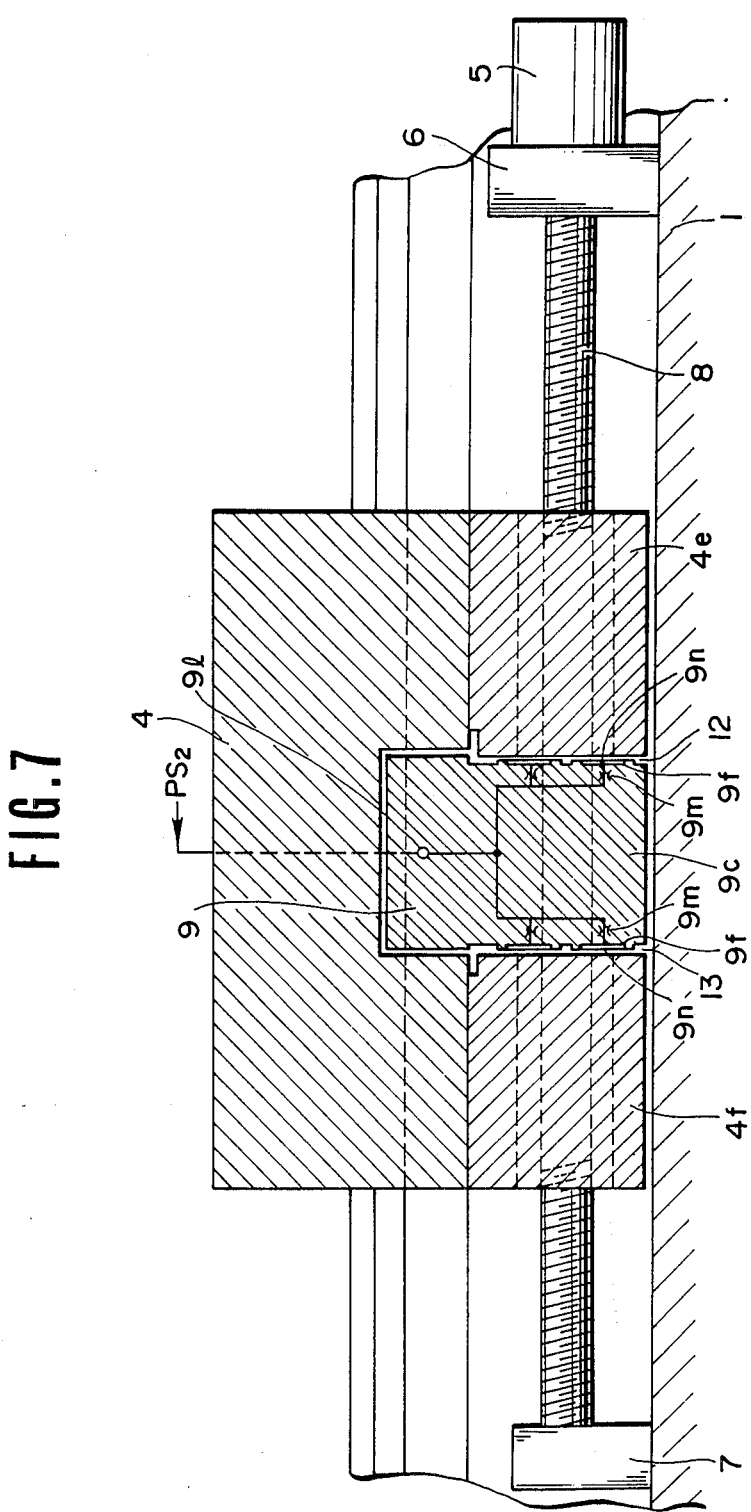
FIG. 7 is another sectional view in the axial direction of the table mechanism.

FIG. 7 is another sectional view in the axial direction of the table mechanism illustrating the hydrostatically supporting portions provided on the opposite surfaces of the lower extensions 4e, 4f of the second table 4 and the lower extension 9c of the first table 9. 12 and 13 are small gaps between the opposite surfaces. The lower extension 9c of the first table 9 is provided with a plurality of hydrostatic pads 9f in a position facing each of the opposite surfaces of the lower extensions 4e, 4f and generally radiating around the feed screw 8. Each of the hydrostatic pads 9f has an opening 9n out of which the hydrostatic fluids branched by the line 9l flow via chokes 9m.

Figure 8:
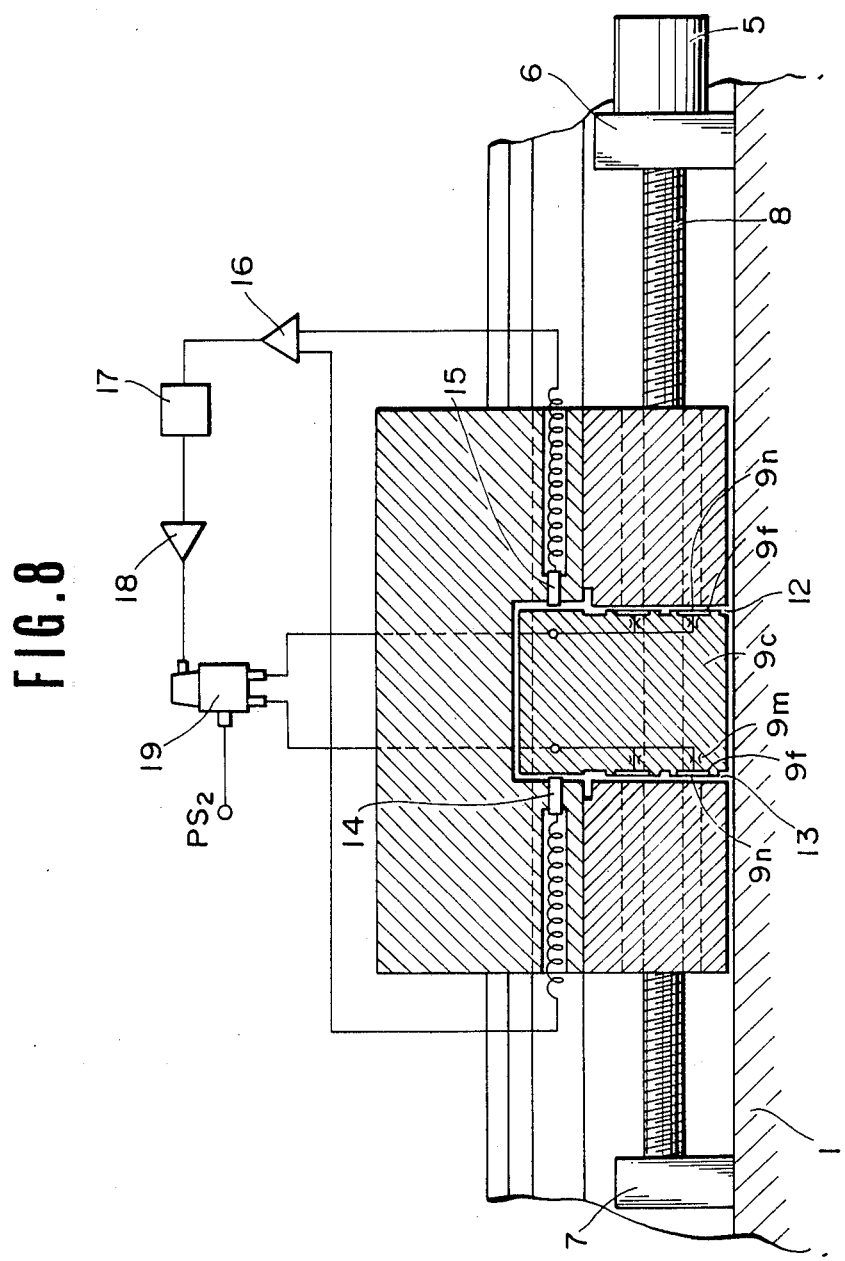
FIG. 8 is a sectional view of the main parts of another embodiment of the invention.

FIG. 8 is a sectional view of the main parts of another embodiment in accordance with the invention. 14 and 15 are displacement detectors, 16 a differential amplifier, 17 a compensation circuit, 18 a servo amplifier, and 19 a servo valve. Electric signals of the displacement detectors 14, 15 are input signals of the differential amplifier 16 whose output passes through the compensation circuit 17 and the servo amplifier 18 and is led to the servo valve 19 as a control signal. In response to this control signal, the servo valve 19 applies fluid pressures to the plurality of hydrostatic pads 9f at the opposite sides of the lower extension 9c and opposed to each other in differential pressure to control the aforementioned gaps 12 and 13 to be kept constant or to correct the gaps more positively, thereby correcting the position of the movement in the feeding direction of the second table 4 and controlling the hydrostatically supporting portions to enhance the coupling strength in accordance with the load put thereon.

Although as a displacement detector this embodiment uses an electrical non-contact detector, it will be understood that a pressure detector may be used for detecting the gaps by pressure.

Next, the attitude control of the second table 4 will be described with reference to FIGS. 9 and 10.

Figure 9:
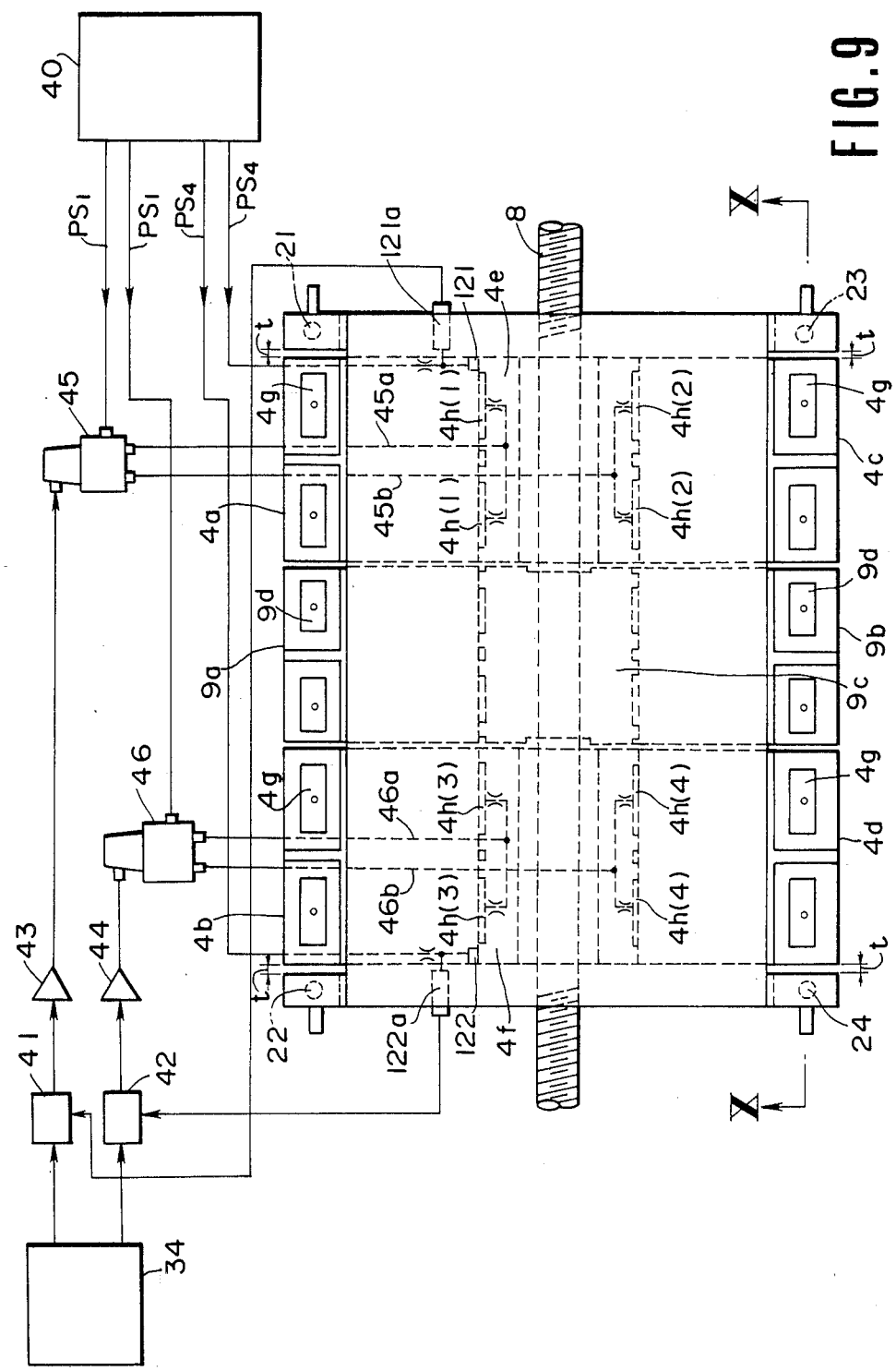
FIG. 9 is a plan view of the first and the second tables including displacement detectors.
Figure 10:
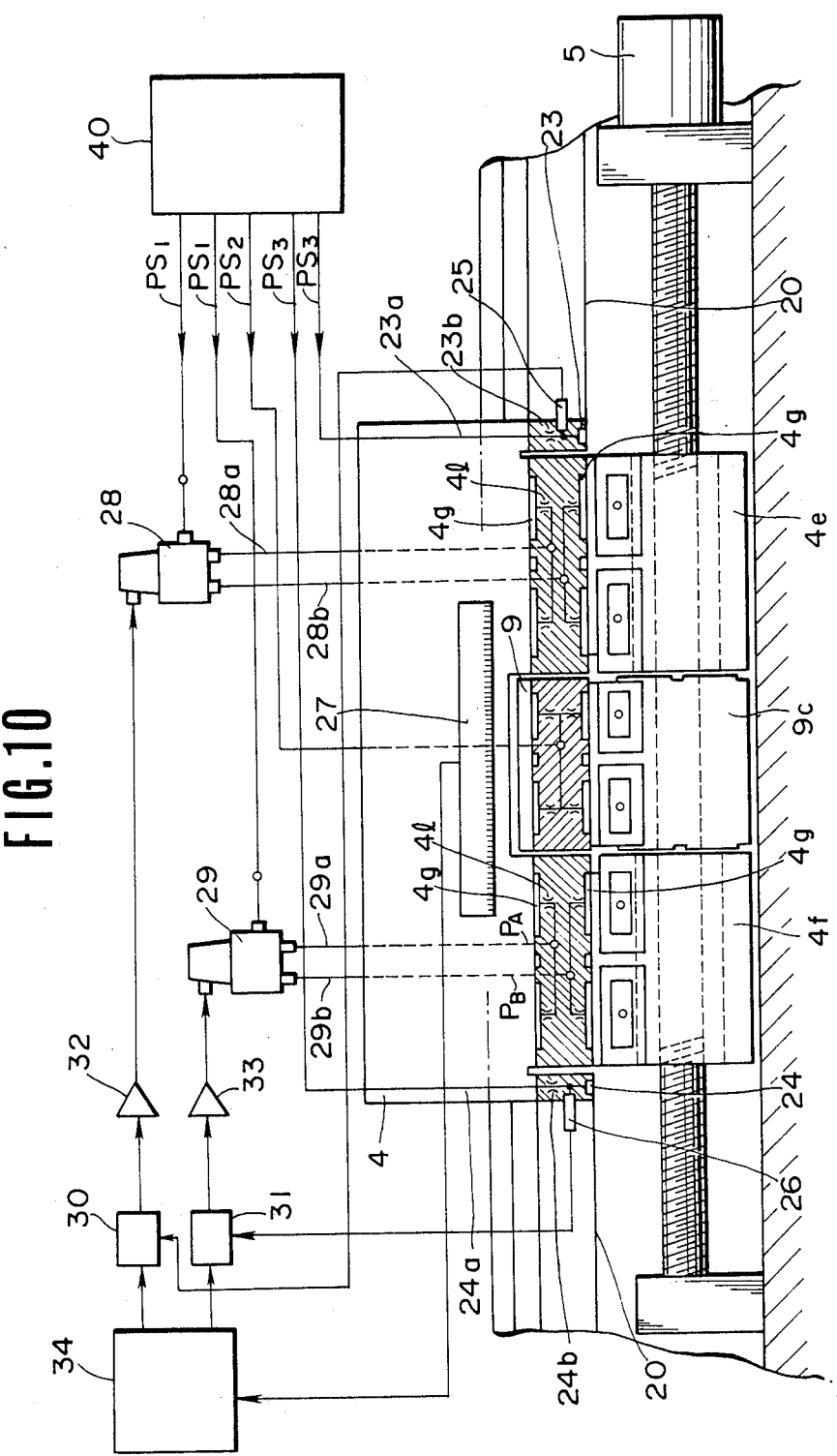
FIG. 10 is a sectional view taken along the line X—X of FIG. 9.

FIG. 9 is a plan view of the first and the second tables including displacement detectors, and FIG. 10 is a sectional view taken along the line X—X of FIG. 9. As mentioned above, the first and the second tables are engagedly guided by the bed 1 and the hydrostatic guides 2 and 3 on the bed. That is to say, along the guide 2, the two horizontal extensions 9a, 9b of the first table 9 and the four horizontal extensions 4a, 4b, 4c and 4d of the second table 4 are engagedly guided, while along the hydrostatic guide 3, the lower extension 9c of the first table 9 and the two lower extensions 4e and 4f of the second table 4 are engagedly guided. These extensions are supported hydrostatically.

In order to facilitate the explanation using FIG. 10, controlling the attitude of the table 4 in the pitching direction will be taken as an example and described in detail. The vertical gaps between each of the four horizontal extensions 4a, 4b, 4c and 4d of the second table 4 and the hydrostatic guide 2 can be varied by supplying differential pressures to the hydrostatic pads 4g of the second table 4. Now, assume that the supply pressure of the upper hydrostatic pads is $P_A$ and the supply pressure of the lower hydrostatic pads is $P_B$. When $P_A$ is larger than $P_B$, the upper gap with respect to the hydrostatic guide 2 becomes large, and when $P_A$ is smaller than $P_B$, it becomes small. In other words, the second table 4 is displaced slightly in the vertical direction by the strength of the supply pressure of the vertical hydrostatic pads 4g. Utilizing this principle, the attitude in the pitching direction is controlled. 20 denotes a reference member, and 23 and 24 denote displacement detectors to which fluids forced from the external fluid pressure source 40 are connected. The fluids flow via chokes 23b and 24b of lines 23a and 24a, respectively toward the reference member 20 and part of the fluids are converted into electric signals by detecting sections 25 and 26. 27 denotes a glass scale attached to the second table 4; 28 and 29 servo valves; 30 and 31 comparison circuits; 32 and 33 servo amplifiers; and 34 a microcomputer system. The relation between the position and the attitude of the second table 4 is previously measured with the glass scale 27 and the displacement detectors 23 and 24, and that relation is inputted into the micorcomputer system 34. Comparison circuits 30 and 31 compare the inputs sent from the microcomputer system 34 with the inputs sent from the detecting sections 25, 26 corresponding to the relative displacement between the displacement detectors 23, 24 and the reference member 20. Then, the circuits subtract so that the coincidence between them occurs, and then send signals to the servo amplifiers 32 and 33, respectively. Next, the amplified signals are led to the servo valves 28 and 29, respectively. The fluid outputs of the servo valves 28 and 29 pass through lines 28a, 28b and 29a, 29b, and are led through chokes 4l to the hydrostatic pads 4g opposed to each other. At this time, pressures are differentially applied to the hydrostatic pads 4g, and as mentioned above, the second table 4 is displaced slightly in the vertical direction. By this method, the attitude of the table 4 in the pitching direction is controlled.

For convenience in explanation with reference to FIG. 10, the operation has been described on the side of the displacement detectors 23, 24 viewed from the line X—X of FIG. 9. However, the same operation is also performed on the side of the displacement dectectors 21, 22 in a symmetrical position with respect to the feed screw 8, and the attitude of the second table 4 in the pitching direction is controlled by displacing slightly the table 4 at a total of four points in the vertical direction.

As clearly shown in FIG. 9, there are provided gaps t between each of sections provided with the displacement detectors 21, 22, 23 and 24 and each of the horizontal extensions 4a, 4b, 4c and 4d. The function of these gaps t is to exclude the influence of fluids supplied to the pads 4g of the horizontal extensions 4a, 4b, 4c and 4d from being exerted on these displacement detectors.

In the same manner, the horizontal attitude of the second table 4 can be controlled. In FIG. 9, 121 and 122 are displacement detectors attached to the vertically guided surfaces of the lower extensions 4e and 4f of the second table 4 for detecting the displacement of these lower extensions with respect to the horizontal guide surface 3; and 121a and 122a are detecting sections for converting the detected displacement to an electric signal. 34 is the aforementioned microcomputer system; 41 and 42 are comparison circuits; 43 and 44 are servo amplifiers; and 45 and 46 are servo valves. In the same manner as in the vertical direction, the relation of the position with the attitude of the second table 4 is previously measured and inputted into the microcomputer 34. Comparison circuits 41 and 42 compare the inputs sent from the microcomputer system 34 with the inputs sent from the displacement detectors 121a and 122a, subtract so that the coincidence occurs between the signals of the displacement detectors 121a, 122a and the signals of the computer system 34, respectively, and then send signals to the servo amplifiers 43 and 44, respectively. Next, the fluid outputs of the servo valves 45, 46 pass through lines 45a, 45b and 46a, 46b and the respective chokes and are led to the opposed hydrostatic pads 4h (1), 4h (2) and 4h (3), 4h (4). At this time, pressures are differentially applied to the hydrostatic pads 4h (1), 4h (2) and 4h (3), 4h (4) to displace slightly the second table 4 in the horizontal direction. By this method, the attitude of the table in the yawing direction is controlled.

Although as a displacement detector this embodiment uses a displacement detector for detecting by fluid pressure, an electrical noncontact detector may also be used. In addition, a laser interferometer, autocollimator and the like may be used to detect directly the attitude of the second table, and the servo valve used to control the attitude as mentioned above.

As clearly shown in the above-mentioned description, according to the invention, a control unit (not shown) commands the second table 4 to effect the desired feed, the driving motor 5 and thus the feed screw 8 are turned, the first table 9 is moved directly in the axial direction, the fluid pressures of hydrostatically supporting portions of the lower extensions of both the first and the second tables impart the second table only a thrust in the axial direction. Thus, the second table serves as a direct-acting table which is extremely accurate, rigid and permits a stable fine feed. That is to say, errors in machining and assembling the table guide surfaces and the feed screw or disturbance exerted by twisting motion of the feed screw will not be transmitted to the second table through the nuts. This leads to an easy attitude control. In addition, the first table engaged with the nuts for screwing onto the feed screw and the second table driven by the first table are engagedly guided on the bed and the guides formed on that bed, thus providing a simple construction. Therefore, this invention has effects of giving usefulness in many fields such as ultraprecision machine tools, measuring instruments and other production systems.

What is clamed is:

1. A table mechanism capable of controlling a table attitude comprising:
    a bed having the shape of an upwardly opening container and provided with a vertical guide recess formed at the bottom thereof and horizontal guide recesses in the opposite inner side portions thereof;
    a pair of supports fixed to said bed;
    a motor fixed to one of said pair of supports;
    a feed screw supported rotatably by said supports, connected to said motor and adapted to be turned by said motor;
    a table drive member which holds nuts for threadingly engaging with said feed screw and which is provided with a lower extension engagedly guided by said vertical guide recess and horizontal extensions engagedly guided by said horizontal guide recesses, said table drive member being driven directly along said nuts by said feed screw; and
    a table mounted on said table drive member and provided with lower extensions engagedly guided by said vertical guide recess for the table drive member and horizontal extensions engagedly guided by said horizontal guide recesses for the table drive member, respectively;
    wherein for said table drive member and said table, hydrostatically coupling portion each comprising hydrostatic pads are formed on a pair of opposed surfaces of said table drive member and said table at right angles to a direction of a movement of said table drive member and said table between the lower extension of said table drive member and each of the lower extensions of said table, and by the hydrostatic coupling, said table is driven integrally with said table drive member.

2. A table mechanism according to claim 1 further comprising for said table drive member and said table, hydrostatically and horizontally supporting portions each comprising a plurality of hydrostatic pads between said horizontal guide recesses and upper surfaces of the horizontal extension of said table drive member, between said horizontal guide recess and lower surfaces of the horizontal extension of the table drive member, between said horizontal guide recesses and upper surfaces of the horizontal extensions of said table, and between said horizontal guide recesses and lower surfaces of the horizontal extension of said table.

3. A table mechanism according to claim 1 further comprising for said table drive member and said table, hydrostatically and vertically supporting portions each comprising a plurality of hydrostatic pads between said vertical guide recess and one of a pair of vertically guided surfaces of the lower extension of said table drive member, between said vertical guide recess and the other of plural pairs of vertically guided surfaces of the lower extension of said table and between said vertical guide recess and the other side of plural pairs of vertical guide surfaces of the lower extension of said table.

4. A table mechanism according to claim 1 wherein each of said hydrostatically coupling portions comprises a plurality of hydrostatic pads.

5. A table mechanism according to claim 1 wherein said each of hydrostatically coupling portions comprises a single annular groove-like hydrostatic pad formed on said pair of opposed surfaces of said table drive member and said table.

6. A table mechanism according to claim 1 further comprising means for detecting gaps between coupling surfaces of the hydrostatically coupling portions formed on said pair of opposed portions at right angles to a direction of a movement of said tables between the lower extensions of said table drive member and each of the lower extensions of said table, and a means for supplying differential pressures to the hydrostatic pads on each of said hydrostatically coupling portions so as to correct the gaps between the hydrostatically coupling portions in response to a detecting signal from said detecting means.

7. A table mechanism capable of controlling a table attitude comprising:
    a bed having the shape of an upwardly opening container and provided with a vertical guide recess formed at the bottom thereof and horizontal guide recesses in the opposite inner side portions thereof;
    a pair of supports fixed to said bed;
    a motor fixed to one of said pair of supports;
    a feed screw supported rotatably by said supports, connected to said motor and adapted to be turned by said motor;
    a table drive member which holds nuts for threadingly engaging with said feed screw and which is provided with a lower extension engagedly guided by said vertical guide recess and horizontal extensions engagedly guided by said horizontal guide recesses, said table drive member being driven directly along said nuts by said feed screw; and
    a table mounted on said table drive member and provided with lower extensions engagedly guided by said vertical guide recess for the table drive member and horizontal extensions engagedly guided by said horizontal guide recesses for the table drive member, respectively;

wherein for said table drive member and said table, hydrostatically coupling portions each comprising hydrostatic pads are formed on a pair of opposed surfaces of said table drive member and said table at right angles to a direction of a movement of said table drive member and said table between the lower extension of said table drive member and each of the lower extensions of said table; and hydrostatically and vertically supporting portions each comprising a plurality of hydrostatic pads are formed between said horizontal guide recesses and upper surfaces of the horizontal extensions of said table drive member, between said horizontal guide recesses and lower surfaces of the horizontal extensions of said table drive member, between said horizontal guide recesses and upper surfaces of the horizontal extensions of said table, and between said horizontal guide recesses and lower surfaces of the horizontal extensions of said table; and hydrostatically and vertically supporting portions each comprising a plurality of hydrostatic pads are formed between said vertical guide recess and one of a pair of vertically guided surfaces of the lower extension of said table drive member, between said vertical guide recess and the other of said pair of vertically guided surfaces of the lower extension of said table drive member, between said vertical guide recess and one side of plural pairs of vertically guided surfaces of the lower extensions of said table, and between said vertical guide recess and the other side of plural pairs of vertically guided surfaces of the lower extensions of said table.

8. A table mechanism according to claim 7 further comprising means for detecting gaps between coupling surfaces of the hydrostatically coupling portions, and means for supplying differential pressures to the hydrostatic pads on each of said hydrostatically coupling portions so as to correct the gaps between the hydrostatically coupling portions in response to a detecting signal from said detecting means.

9. A table mechanism according to claim 7 further comprising means for detecting a displacement of the horizontal extensions of said table with respect to said horizontal guide recess and a means for supplying differential pressures to the hydrostatic pads on the upper and lower surfaces of the horizontal extensions of said table so as to control the attitude of said vertical direction in response to a detecting signal from said detecting means.

10. A table mechanism according to claim 7 further comprising means for detecting a displacement of the lower extensions of said table with respect to the vertical guide recess wherein a detecting signal from the detecting means and a table attitude signal at each table position are inputted into a comparison circuit, an output of the comparison circuit is amplified by a servo amplifier, the servo amplifier supplies an output as a control signal to a servo valve, the servo valve responds to said control signal and divides the pressure of a fluid supplied from an external fluid pressure source, and differential pressures are supplied to said hydrostatic pads on said pair of vertically guided surfaces of the lower extensions of the table so as to control the attitude of the table in a horizontal direction.

11. A table mechanism capable of controlling a table attitude comprising:

a bed having the shape of an upwardly opening container and provided with a vertical guide recess formed at the bottom thereof and horizontal guide recesses in the opposite inner side portions thereof;

a pair of supports fixed to said bed;

a motor fixed to one of said pair of supports;

a feed screw supported rotatably by said supports, connected to said motor and adapted to be turned by said motor;

a table drive member which holds nuts for threadingly engaging with said feed screw and which is provided with a lower extension engagedly guided by said vertical guide recess and horizontal extensions engagedly guided by said horizontal guide recesses, said table drive member being driven directly along said nuts by said feed screw;

a table mounted on said table drive member and provided with lower extensions engagedly guided by said vertical guide recess for the table drive member and horizontal extensions engagedly guided by said horizontal guide recesses for the table drive member, respectively;

wherein for said table drive member and said table, hydrostatically coupling portions comprising hydrostatic pads are formed on a pair of opposed surfaces of said table drive member and said table at right angles to a direction of a movement of said table drive member and said table between the lower extension of said table drive member and each of the lower extensions of said table; hydrostatically and horizontally supporting portions each comprising a plurality of hydrostatic pads are formed between said horizontal guide recesses and upper surfaces of the horizontal extensions of said table drive member, between said horizontal guide recesses and lower surfaces of the horizontal extensions of said table drive member, between said horizontal guide recesses and upper surfaces of the horizontal extensions of said table, and between said horizontal guide recesses and lower surfaces of the horizontal extensions of said table; hydrostatically and vertically supporting portions each comprising a plurality of hydrostatic pads are formed between said vertical guide recess and one of a pair of vertically guided surfaces of the lower extension of said table drive member, between said vertical guide recess and the other of said pair of vertically guided surfaces of the lower extension of said table drive member, between said vertical guide recess and one side of plural pairs of vertically guided surfaces of the lower extensions of said table, and between said vertical guide recess and the other side of plural pairs of vertically guided surfaces of the lower extensions of said table;

means for detecting gaps between coupling surfaces of the hydrostatically coupling portions wherein detecting signals from said detecting means are connected to two inputs of a differential amplifier, said differential amplifier supplying an output as a control signal through a servo amplifier to a servo valve, said servo vlave responding to said control signal and dividing the pressure of the fluid supplied from an external fluid pressure source and differential pressures are supplied to the hydrostatic pads on each of said hydrostatically coupling portions so as to correct the gaps between the hydrostatically coupling portions;

means for detecting a displacement of the horizontal extensions of said table with respect to said horizontal guide recess wherein a detecting signal from the detecting means and a table attitude signal at each table position are inputted into a comparison circuit, an output of the comparison circuit is amplified by a servo amplifier, the servo amplifier supplies an output as a control signal to a servo valve, the servo valve responds said control signal and divides the pressure of a fluid supplied from an external fluid pressure source, and differential pressures are supplied to the hydrostatic pads on the upper and lower surfaces of the horizontal extensions of said table so as to control the attitude of the table in a vertical direction; and means for detecting a displacement of the lower extensions of said table with respect to the vertical guide recess wherein a detecting signal from the detecting means and a table attitude signal at each table position are inputted into a comparison circuit, an output of the comparison circuit is amplified by a servo amplifier, the servo amplifier supplies an output as a control signal to a servo valve, the servo responds to said control signal and divides the pressure of a fluid supplied from an external fluid pressure source, and differential pressures are supplied to said hydrostatic pads on said pair of vertically guided surfaces of the lower extensions of the table so as to control the attitude of the table in a horizontal direction.

* * * * *